United States Patent
Plouzen

(10) Patent No.: US 6,467,429 B1
(45) Date of Patent: Oct. 22, 2002

(54) VARIABLE DIMENSION POULTRY FEEDER

(76) Inventor: Philippe Plouzen, Kersaliou, 29250 Sibiril (FR)

( * ) Notice: Subject to any disclaimer, the term of this patent is extended or adjusted under 35 U.S.C. 154(b) by 0 days.

(21) Appl. No.: 09/629,736

(22) Filed: Jul. 31, 2000

(30) Foreign Application Priority Data

Apr. 22, 1998 (FR) .............................................. 98 05335
Apr. 20, 1999 (EP) .......................................... 99 460025

(51) Int. Cl.[7] .............................................. A01K 39/00
(52) U.S. Cl. ...................................................... 119/61
(58) Field of Search .............................. 119/52.1, 52.4, 119/53, 57, 58, 61, 900

(56) References Cited

U.S. PATENT DOCUMENTS

| | | | | |
|---|---|---|---|---|
| 1,200,275 A | * | 10/1916 | Tremper | |
| 1,771,647 A | * | 7/1930 | Moe | |
| 2,163,186 A | * | 6/1939 | Bergeron | 119/53 |
| 2,361,598 A | * | 10/1944 | Calhoon | 119/61 |
| 2,735,402 A | * | 2/1956 | Lorenzo | 119/61 |
| 4,375,791 A | * | 3/1983 | Peppler | 119/52 AF |
| 5,778,821 A | * | 7/1998 | Horwood et al. | 119/53 |

* cited by examiner

Primary Examiner—Charles T. Jordan
Assistant Examiner—Kimberly S. Smith
(74) Attorney, Agent, or Firm—Ryan M. Fountain

(57) ABSTRACT

The present invention provides a feeder for poultry including a receptacle (20) having two chutes (21,22) of which one is made to be located inside the other chute, said chutes being able to assume different positions relative to one another, between one position where said first chute (21) is inside the second chute (22), the receptacle presenting its lowest capacity for feed presentation, and another position where said chutes (21,22) only overlap in an area of small size, the receptacle thus presenting its highest capacity for feed presentation.

12 Claims, 3 Drawing Sheets

VARIABLE DIMENSION POULTRY FEEDER

BACKGROUND AND SUMMARY OF THE INVENTION

The present invention concerns a feeder for poultry, used mainly in a poultry feeding facility. In particular, the present invention relates to apparatus for feeding poultry or like animals in large scale houses over the entire life cycle of the animals.

Such a facility typically includes a feed-distribution system connected to screw conveyors mounted in very long tubes. Regularly spaced along each conveyor are several feeders, pans or receptacles connected to the conveyors so as to receive feed therefrom. The feed transported by each tube is routed to the feeders as they are being emptied, so as to refill them.

One feeder of the type typically used in such a distribution installation, for example, is described in Patent Document EP-A-68 023. In its simplest form, that consists of a circular cup with raised edges attached by means of shafts to a gear on the feed supply tube. A controllable feeding system above is provided to refill the cup from the feed supply tube.

An inconvenience of that type of feeder comes from the fact that it is not adapted to use by all ages of poultry, from chick to chicken. The feeder described in the above-mentioned patent is, in effect, adapted to older chickens, the edges of this feeder are generally too high for young chicks.

The purpose of the present invention, then, is to propose a feeder related to the type just described, but which is adapted to use by animals of young age as well as adult animals.

Another purpose of the invention is to provide a feeder, the feed capacity of which can be varied according to the age of the animals to which it is applied.

To this effect, a feeder according to the present invention is characterized by its including a receptacle consisting of two chutes or sections of which one is able to be lodged inside the other, said chutes being able to assume between them all relative positions between a position where the first chute is inside the other chute, so that the receptacle presents its smallest capacity for feed presentation, and another position where said chutes only overlap in an area of small size, so that the receptacle presents its highest capacity for feed presentation.

According to another characteristic of the present invention, said two chutes, to be able to assume their said relative positions, are able to pivot freely one about the other and independently of each other. Appropriately, each chute is shaped as a portion of a cylinder.

According to another characteristic of the present invention, it includes a feed hopper in the general shape of an inverted V, with an opening at its top through which the feed from a distribution system is emptied and with an opening in its lower part, that empties into the receptacle.

According to another characteristic of the present inventions, inside the hopper, there is a feed flow directing wall in the general shape of an inverted V.

According to another characteristic of the present invention, said feeder includes a manual control system for pivoting or moving the chutes between a variety of desired positions of different feed retaining capacity or no feed retaining capacity.

According to one production variation, said feeder includes a control system for pivoting the chutes that is equipped with a cable, a connection system attached to the cable on one end, and, on the other end, attached to the outer edges of each of the chutes, by means of shafts, rods or additional cables.

According to another characteristic of the present invention, the connection system consists of a first lever that can pivot about a pin and two secondary levers connected to the pin, the free ends of the secondary levers are connected to the edges of the chutes.

According to another characteristic of the present invention, one edge of each chute is made with a ledge. According to another characteristic of the present invention, it is possible to pivot the two chutes to their maximum position, in such a way that they no longer overlap, thus opening the lower part of the receptacle.

The characteristics of the invention mentioned above, as well as others, will appear more clearly in reading the following description of preferred embodiments of the present invention, said description relating to the attached drawings, among which:

DESCRIPTION OF PREFERRED EMBODIMENTS

Figure 1:
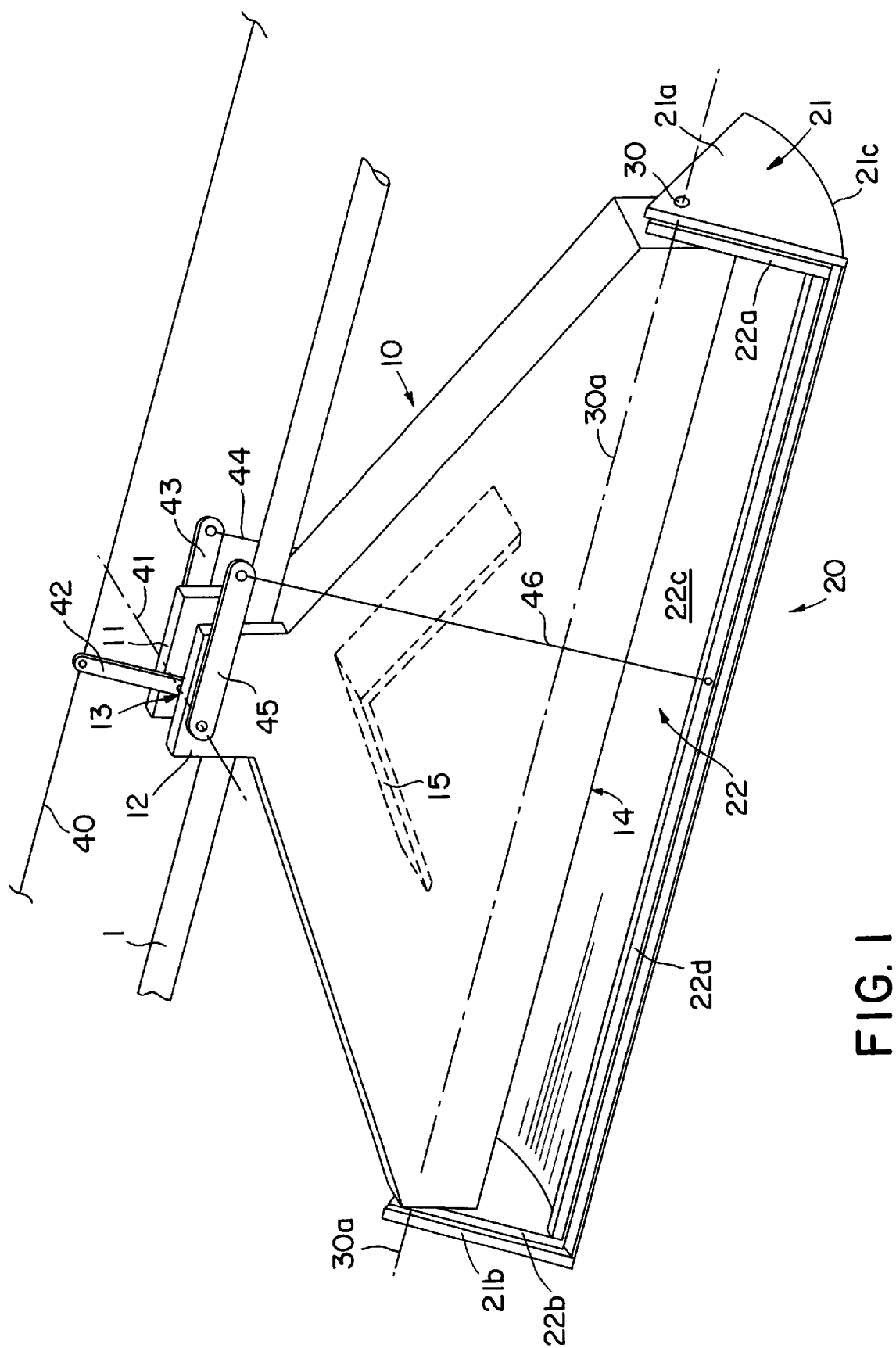
FIG. 1 is a perspective view of a feeder according to the present invention, said feeder being in a position of low capacity.

The feeder in FIG. 1, in a simplified form, consists of a feeder pan of feed hopper 10 in the general shape of an inverted V. This hopper serves as a reservoir of feed. The top of the hopper 10 is, for example, formed from two plates 11 and 12 that serve to fix with respect to it to a feed distribution system, consisting, for example, of a substantially horizontal tube 1 in which there is a conventional feed screw conveyor. In a large scale poultry feeding system, a plurality of such hoppers 10 are disposed along a length of tube 1. Hopper 10 is made with an opening 13 through which the feed from the distribution system conveyor is allowed to flow into hopper 10 in a conventional manner. The lower part of hopper 10 is made with an opening 14 which extends, for example, its entire length and entire width. Hopper 10 is configured and arranged to empty the feed from the distribution system conveyor into a receptacle 20 formed at the lower portion of hopper 10.

In the preferred embodiment illustrated, receptacle 20 essentially consists of two relatively movable walls or chutes 21 and 22. Chute 21 can, for example, be formed from two lateral walls 21a and 21b, each of those walls presenting an arc of circular section, and a back wall 21c supported by and joining the arcs of lateral walls 21a and 21b so that chute 21 presents the shape of a portion of a cylinder or the shape of a curved cradle or the shape of a trough.

Similarly, chute 22 preferably consists of two lateral walls 22a and 22b and a back wall 22c connected to and bearing on the lower edges of the lateral walls 22a and 22b so that it also presents the shape of a portion of a cylinder or the shape of a curved cradle.

In the illustrated example, chute 22 is of such dimensions that it can be placed closely inside chute 21, the outside face of wall 22c of chute 22 adjacent to the inside face of wall 21c of chute 21, preferably so as to seal against the flow of feed therebetween.

On their upper parts, lateral walls 21a and 21b of chute 21 as well as lateral walls 22a and 22b of chute 22 are preferably pierced by a hole made to receive horizontal pins 30 connected to hopper 10. In the illustrated example, each pin is aligned along a longitudinal axis 30a and chutes 21 and 22 are mounted so as to pivot freely and independently of each other about these pins 30 on that axis so as to assume an open position as shown in FIG. 1, with chute 22 disposed inside chute 21, or a closed position shown in FIG. 2, in which said chutes 21 and 22 overlap only in an area of small size. Stated another way, chutes 21 and 22 are pivotably connected so as to form a butterfly joint between them.

In preferred embodiments, the distance between opening 14 and chute 22 is established to be smaller than an area within which the poultry or animals being fed can enter. Thus, when chutes 21 and 22 fully overlap, the poultry can get their head in to peck at the feed on the chutes, but not actually stand on the chutes to enter receptacle 20 and thereby contaminate the feed.

Figure 2:
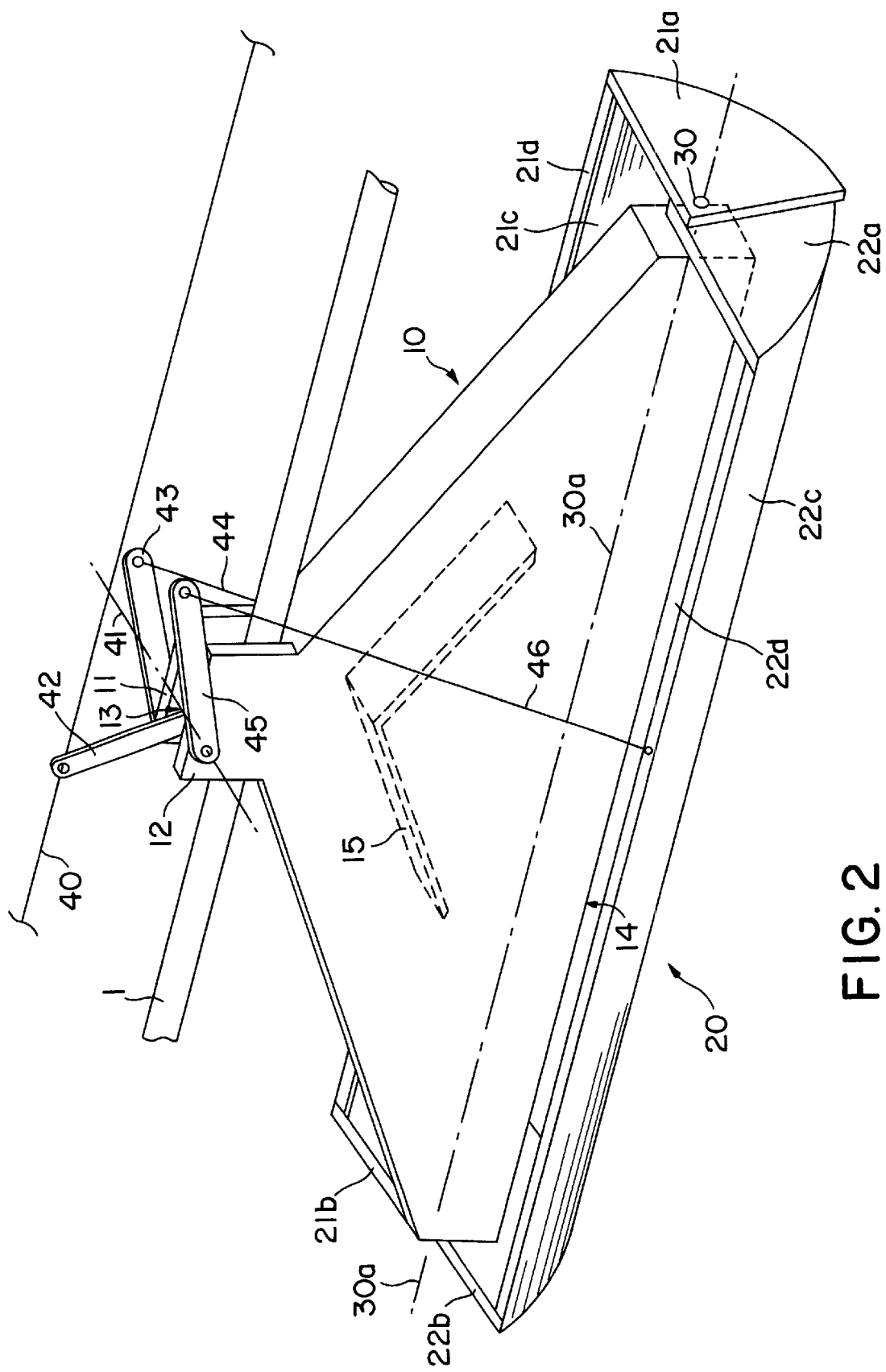
FIG. 2 is a perspective view of the feeder of FIG. 1, said feeder being in a position of high capacity.

One will note that in the open position of FIG. 1, the feed retaining capacity of receptacle 20 is at its lowest, while in the closed position of FIG. 2, it is at its highest. Controlling the relative position or opening and closing of chutes 21 and 22 can be done manually, for example, by a hand wheel mounted at the level of pin 30. However in FIGS. 1 and 2, a remote control system is shown.

In a simplified version, this control system consists of a cable 40 that runs parallel to tube 1 of the distribution system and can connect to each of the hoppers 10 used along tube 1 so as to provide simultaneous control. A lever 42 is mounted between the two plates 11 and 12 of hopper 10. Lever 42 pivots about a laterally extending rod or pin 41 perpendicular to said plates 11 and 12. The free end of lever 42 is attached to cable 40. Lever 43 is mounted integral with pin 41, outside plate 11 in the illustrated example. The free end of lever 43 is connected to the outside edge of chute 21 by means of cable, rod or shaft 44. Similarly, another lever 45 is mounted integral with pin 41, outside plate 12, The free end of lever 45 is connected to the outside edge of chute 22 by means of cable, rod or shaft 46.

One will note that levers 42,43, and 44 constitute a connection system for the movement of cable 40 over the edges of each chute 21 and 22, by means of shafts 44 and 46.

In FIG. 2, cable 40 has been pulled to the left of this FIG. 2. As a result, lever 42 has pivoted about pin 41, a pivoting that has itself caused the pivoting of levers 43 and 45. In pulling on shafts 44 and 46, the pivoting of levers 43 and 45 has caused chutes 21 and 22 to pivot about their pins 30. Thus, the feeder is in a high capacity position for retaining poultry feed therein. In those embodiments where cable 40 is commonly used by a plurality of feeders, pulling on the cable to the left or to the right will result in all feeders being adjusted simultaneously and remotely from the feeder location. This represents a significant maintenance and usage advantage over prior feeder systems where each feeder was required to be individually adjusted each time the receptacle volume needed to be changed.

In side hopper 10, there is a bridge wall 15, in the general shape of an inverted V which serves to separate the flow of feed coming from entrance 13 and to retain a portion of the feed within hopper 10 as a reservoir. Thus, the feed in the reservoir can be kept more fresh and uncontaminated than the feed exposed in receptacle 20 until such time and the volume of feed in receptacle 20 is lowered by consumption. The feed in hopper 10 then automatically falls into receptacle 20.

One will note that the outside edge of each chute 21, 22 can include a ledge 21d and 22d, which helps to prevent the feed contained in receptacle 20 from spilling.

One will note that in the example described and considered to be suitable for a production version of the invention, each of chutes 21 22 present the shape of a portion of a cylinder with flat end-walls. However, a person skilled in the field will understand that the end-walls could just as easily be hemispheric and likewise that each chute 21 and 22 could present the shape of a hemisphere, inasmuch as the first chute 21 could be inside the second chute 22 in one position, and that, in another position, they could only overlap in a small-sized area.

One will also note that in rotating the two chutes to the maximum extent, as if cable 40 has been pulled even further to the left from the position shown in FIG. 2, back walls 21c and 22c will not overlap at all, thus opening the lower part of receptacle 20 and retaining no feed therein. In fact, it is envisioned that the chutes can be rotated so far as to abut plates 11 and 12, thereby permitting full exposure to opening 14 and the interior of hopper 10 from below hopper 10. Such opening of receptacle 20 can provide a important advantages, especially for emptying and cleaning of receptacle 20 and/or hopper 10 between flocks of poultry being raised.

Figure 3:
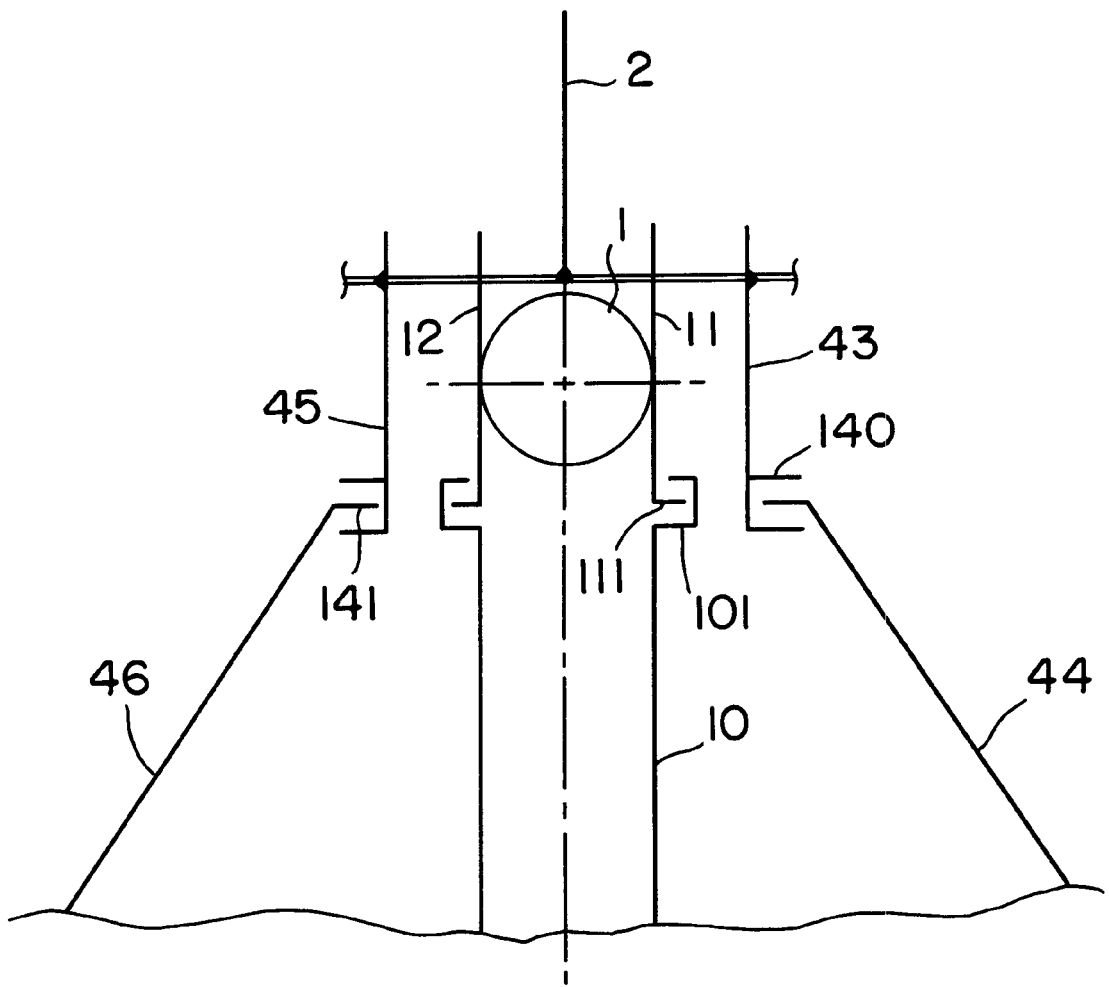
FIG. 3 is a partial, schematic view of a cross section of the feeder, taken laterally with respect to FIG. 1.

FIG. 3 shows the assembly of a feeder according to one production variation of the invention, on tube 1 of a distribution system. According to this variation, hopper 10 is mounted on a tube 1 so that the feeder assembly can rotate about a vertical axis 2. To do this, the top of hopper 10 includes an annular groove 101 in which a disc 111 is located where the two plates 11 and 12 bracketing tube 1 are attached. On the other hand, arms 43 and 45 have their lower ends made with annular groove 140, and shafts 44 and 46 have their upper ends attached to ring 141 located in annular groove 140. This variation permits the feeder to be oriented, for example, so that receptacle 20 is turned 90 degrees with respect to the view of FIGS. 1 and 2, axis 30a being then orthogonal to the longitudinal axis of tube 1, as where a greater number of feeders are desired to be employed along tube 1, more closely spaced.

Thus, it will be seen that the present invention provides a receptacle for retaining feed that is expandable in volume to control the amount of feed retained therein. This invention allows both the surface area of feed and the depth of the feeder to be regulated as desired according to the age and nature of the poultry being fed. It will be understood that the present invention can be similarly used in the feeding of other animals besides poultry.

The invention permits the receptacle to also be shifted pivotably to a feed emptying configuration with no feed retained therein to facilitate cleaning. Various alternative embodiments are contemplated by the present invention, including the provision of a third wall member mounted between chutes 21 and 22 for expanded capacity. In that variant, the third wall could be relatively fixed, with two sets of pins 30 mounted on each end thereof to permit chutes 21 and 22 to move relative to the third wall. In that case the axis of movement of chute 21 about its pins 30 would preferably be parallel to the axis of movement of chute 22 about its pins 30. In another embodiment of the present invention chutes 21 and 22 use separate pins 30 at each end, rather than share a common pin 30 at each end as shown in the Figures. If such separate pins 30 are used, the axis between each set of pins for each chute is preferably parallel. Another embodiment could include only a single movable chute, pivotable about a single, relatively fixed wall.

Further, alternative control systems can be employed to move chutes 21 and 22 simultaneously or individually, as desired in particular applications. Although it is often desirable to have each receptacle 20 in the feeder systems configured to retain the same volume of feed, in particular situations, receptacles 20 can be individually controlled to differing volumes of feed.

It will now be apparent to those of skill in the art of poultry feeding that additional variations of the present invention can be employed in particular applications. Accordingly, the spirit and scope of the present invention are not limited only to the illustrated examples above, but instead only be the terms of the claims defined below.

What is claimed is:

1. A feeder for poultry, characterized by including a receptacle consisting of two chutes of which one is made to be located inside the other chute, said chutes being able to assume all positions relative to one another, between one position where the first chute is inside the second chute, the receptacle presenting its lowest capacity, and another position where said chutes only overlap in an area of small size, the receptacle thus presenting its highest capacity, further characterized by having said two chutes, in order to assume their said relative positions, being made to be able to pivot freely about one another and independently of one another.

2. The feeder according to claim 1, characterized by having each chute present the shape of a portion of a cylinder.

3. The feeder according to claim 2, characterized by its including a feed hopper in the general shape of an inverted V, with its top made with an opening through which the feed from a distribution system is emptied and, in its lower part, an opening emptying into the receptacle.

4. The feeder according to claim 3, characterized by having, inside the feed hopper, a feed flow separating wall in the general shape of an inverted V.

5. The feeder according to claim 4, characterized by having the assembly of the feed hopper mounted on a conveyor tube of said distribution system be such that said feeder can turn about a vertical axis.

6. The feeder according to claim 5, characterized by including a control system for the pivoting of the chutes that is manual.

7. The feeder according to claim 6, characterized by including a control system for pivoting the chutes that is equipped with a cable, of a connection system that is attached on one end to the cable and on the other end to the outside edges of the chutes through shafts.

8. An expandable receptacle for use in feeding poultry comprising:
   at least a first and a second wall, at least one of which is movable relative to the other, that define a feed retaining region,
   means connected to at least one of the walls for changing the position of that wall relative to the other wall and thereby changing the volume of the feed retaining portion.

9. An expandable receptacle for use in feeding poultry comprising:
   at least a first and a second wall, at least one of which is movable relative to the other, that define a feed retaining region,
   means connected to at least one of the walls for changing the position of that wall relative to the other wall and thereby changing the volume of the feed retaining portion,
   wherein the first and second walls are pivotably mounted for movement about parallel axes,
   and where in the first wall overlaps the second wall and those walls seal against feed flow therebetween when defining a feed retaining region.

10. The apparatus according to claim 9 wherein the first wall is spaced apart from the second wall without overlap when there is no feed retaining region defined therebetween.

11. The apparatus according to claim 10 wherein the first and second wall are curved so as to each define a cylindrical surface.

12. A poultry feeder having a first structural member and a second structural member for retaining feed therebetween, each of those members being mounted within the feeder so as to freely pivot about one another and independently of one another, and the first structural member being located to overlap the second structural member.

* * * * *